No. 757,380. PATENTED APR. 12, 1904.
W. O. & J. D. WORTH.
POWER INSTALLATION FOR SELF PROPELLED VEHICLES.
APPLICATION FILED JAN. 23, 1904.
NO MODEL. 2 SHEETS—SHEET 1.
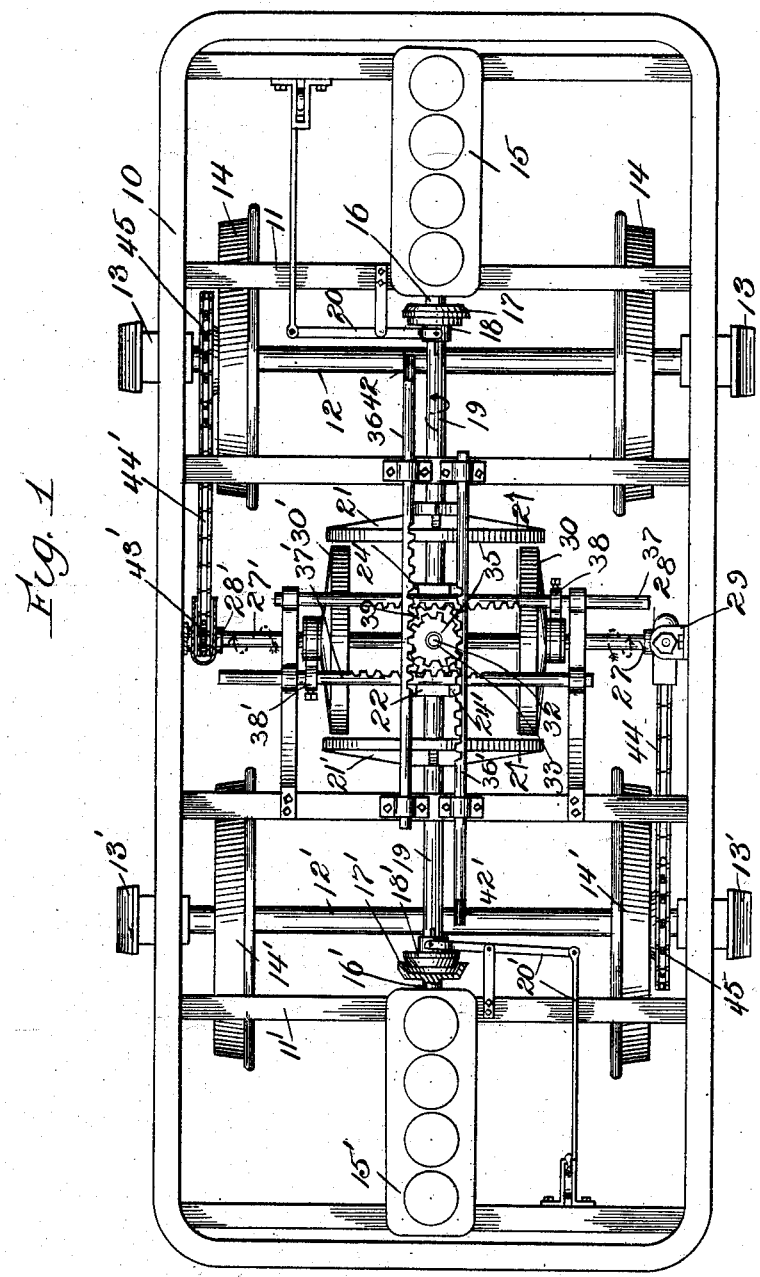

No. 757,380. PATENTED APR. 12, 1904.
W. O. & J. D. WORTH.
POWER INSTALLATION FOR SELF PROPELLED VEHICLES.
APPLICATION FILED JAN. 23, 1904.
NO MODEL. 2 SHEETS—SHEET 2.
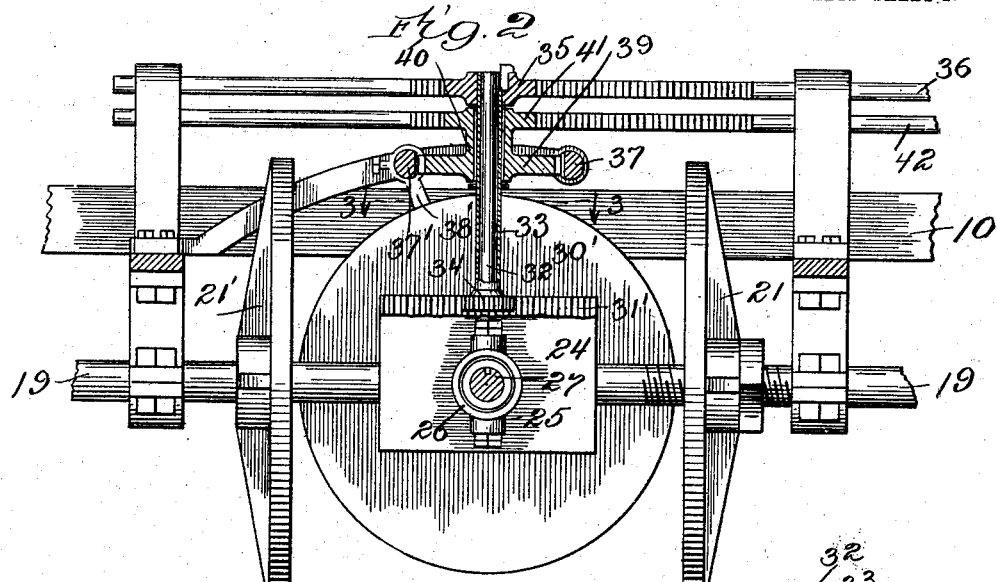
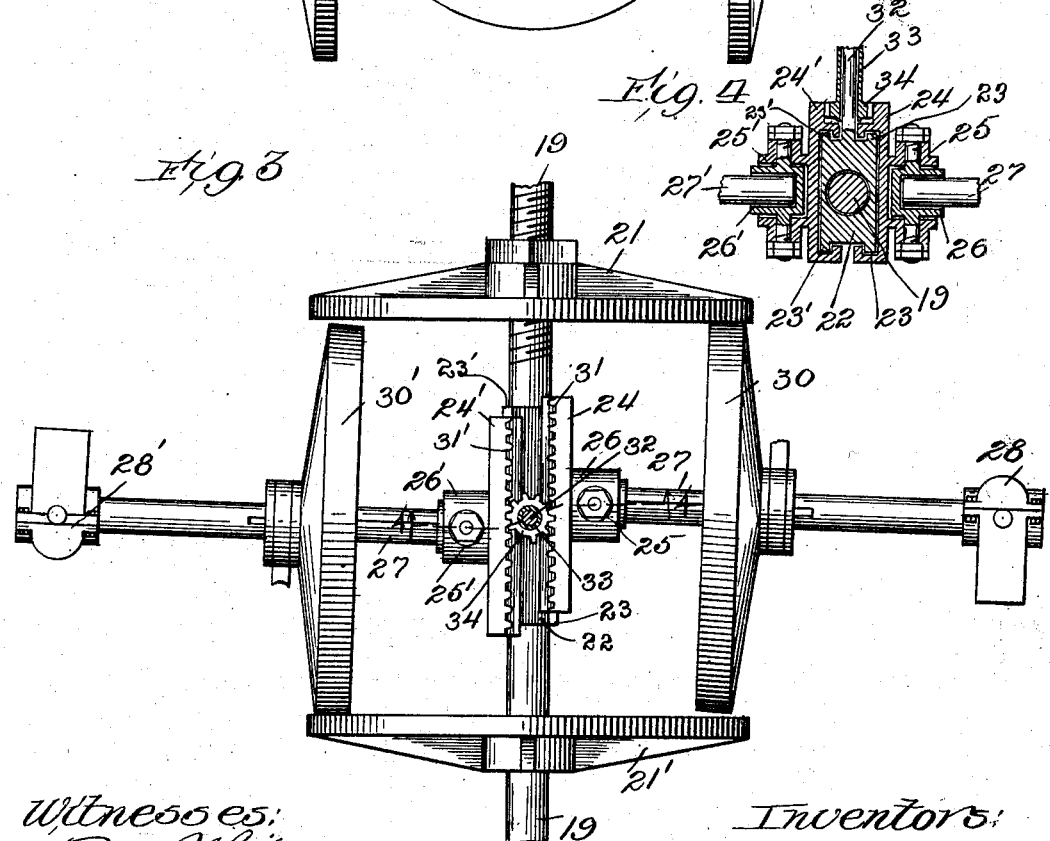
Witnesses:
Ray White
Harry R. White
Inventors:
William O. Worth,
John D. Worth,
By Foree Bain Atty.

No. 757,380.                                                           Patented April 12, 1904.

UNITED STATES PATENT OFFICE.

WILLIAM O. WORTH AND JOHN D. WORTH, OF CHICAGO, ILLINOIS.

POWER INSTALLATION FOR SELF-PROPELLED VEHICLES.

SPECIFICATION forming part of Letters Patent No. 757,380, dated April 12, 1904.

Application filed January 23, 1904. Serial No. 190,352. (No model.)

*To all whom it may concern:*

Be it known that we, WILLIAM O. WORTH and JOHN D. WORTH, of Chicago, in the county of Cook and State of Illinois, have invented certain new and useful Improvements in Power Installation for Self-Propelled Vehicles; and we hereby declare that the following is a full, clear, and exact description thereof, reference being had to the accompanying drawings, which form part of this specification.

Our invention relates to self-propelled vehicles, and has particularly to do with the power installations of self-propelled vehicles.

Among the salient objects of our invention is to provide a power-installation system peculiarly adapted to street-cars, wherein two independent primary sources of power, one at each end of the car, are arranged to independently impress rotative power upon a bodily-stationary main or driving shaft, such devices being combined with frictional power-transmission devices adapted to transmit power simultaneously to the front and rear car-axles; to provide a device of the character described wherein the transmission mechanism is so arranged that no end thrust is imposed upon the main or driving shaft, and to provide a power-transmission device of improved and advantageous structure.

With a view to attaining these and other objects, which will become apparent to those skilled in the art from the following description, our invention consists in the features of construction and arrangement of parts hereinafter more fully described, and pointed out in the claims.

In the drawings we have illustrated our invention as embodied in a street-car.

Figure 1 is a top plan view of the frame, running-gear, and power installation of a car. Fig. 2 is an enlarged section on line 2 2 of Fig. 1, showing only the transmission devices. Fig. 3 is a plan view of the transmission devices, taken substantially on line 3 3 of Fig. 2. Fig. 4 is a sectional detail on line 4 4 of Fig. 3.

Throughout the drawings like numerals of reference refer always to like parts.

10 indicates generally the rectangular frame of a car provided with supporting cross-bars 11 in suitable position to afford support to the mechanism herein described.

12 and 12' indicate, respectively, what we will arbitrarily term the "front" and "rear" axles of the car, (though it will be apparent that the car might be run equally well in either direction.)

13 13 and 13' 13' indicate journal-boxes wherein the axles 12 and 12' are rotatively supported.

14 14 and 14' 14' indicate the wheels rigidly mounted on the front and rear axles, respectively.

15 15' indicate two primary sources of power conventionally illustrated as four-cylinder gas-engines, mounted, respectively, on the front and rear ends of the frame in longitudinal alinement. Said engines are provided with power-shafts, (indicated, respectively, at 16 16',) each provided at its inner end with one member of a friction-clutch—for instance, the bodily-stationary member—as indicated at 17 and 17', respectively.

18 and 18' indicate, respectively, the bodily-movable members of the front and rear clutches arranged on opposite ends of a longitudinally-extending bodily-stationary main or driving shaft 19. Suitable mechanisms, being indicated generally at 20 and 20', are provided for independently manipulating the movable members 18 and 18' of the clutches, each from its end of the car, so that the driving-shaft 19 may be connected with either one or both of the prime motors 15 and 15' to receive rotation therefrom.

21 and 21' indicate two driving-disks mounted in face-to-face or confronting relation upon the shaft 19 at suitable distance apart.

22 indicates a sleeve, generally rectangular in cross-section, loosely surrounding the shaft 19 and centrally positioned intermediate the driving-disks 21 and 21'. The sleeve 22 is provided at the corners of its upper and lower faces with longitudinal ribs or flanges 23 and 23' to form guides for two bearing-slides 24 and 24', shaped to interfit with said flanges 23 and 23'. The bearing-slides 24 and 24' are provided with outwardly-projecting extensions 25 25', recessed laterally to receive the horizontal bearing members 26 and 26'. These bearings 26 26' are pivoted vertically in the extensions 25, so as to be capable of oscillation.

27 27' indicate two independent driven shafts arranged on opposite sides of the shaft 19 in a common horizontal plane therewith and finding bearing at their inner ends in the members 26 26', respectively. At the outer ends of the shafts 27 27' are supported in bearing-sleeves 28 28, vertically pivoted in brackets 29 29', carried by the frame 10.

30 and 30' indicate two driven wheels fixed against rotation, but longitudinally slidable upon the shafts 27 27', respectively. Said wheels are arranged between the driving-disks 21 21' in such relation thereto that when in exact coaxial position, as illustrated in Fig. 1, the wheels just escape both of the disks 21 21'.

Suitable means are provided for simultaneously sliding the bearing-slides 24 24' in opposite directions longitudinally of the driving-shaft, and other means are provided for simultaneously sliding the driven wheels 30 30' in opposite directions longitudinally of their respective shafts—that is to say, transversely of the driving-disks 21 21'.

In the specific construction shown 31 31' indicate racks formed upon the upper surfaces of the slide members 24 and 24' and arranged in confronting relation.

32 indicates a rod projecting upward from the sleeve 22, with which said rod is preferably fixedly united or integrally formed.

33 indicates a sleeve surrounding the rod 32 and provided on its lower end with a spur-gear 34, arranged in mesh with the confronting racks 31 and 31' of the sliding bearing members. At a suitable point above the plane of the various gear members the sleeve 33 is provided with a second gear member 35, arranged in mesh with two longitudinally-extending slidable racks 36 and 36', which extend through suitable bearings in opposite directions toward the front and rear end of the machine, respectively. It will be understood that suitable manual actuating mechanisms for the operating-racks 36 36' are provided at the ends of the car toward which said racks, respectively, extend; but such mechanisms form no part of my invention, and are therefore not shown, as suitable constructions will readily suggest themselves to those skilled in the art.

The mechanism provided for reciprocating the driven wheels 30 and 30' comprise two racks 37 37', mounted to slide transversely of the frame 10 or longitudinally of the driven shaft and suitably connected, as by yokes 38 38', with the wheels 30 and 30', respectively, in such manner as to permit said wheels to freely rotate, but to move said wheels longitudinally therewith. The two racks 37 37' are arranged in confronting relation to mesh with a gear member 39, carried by a sleeve 40, mounted for free rotation upon a sleeve 33 and provided at its upper end with a spur-gear 41.

42 and 42' indicate sliding rack-rods extending, respectively, to the front and rear ends of the vehicle and arranged in mesh with the said gear member 41 to actuate the same when said rods are longitudinally moved. In practice it will be understood that these rods are associated with any suitable mechanism to be controlled by the motorman of the car; but as the particular control mechanism employed forms no part of our present invention we deem it unnecessary to show any specific construction of control mechanism, as suitable devices will readily suggest themselves to those skilled in the art.

Driving connection is established between each of shafts 27 and 27' and the respective car-axles.

Specifically 41' is a chain running over a sprocket 43', carried by the driven shaft 27', and a sprocket 45', carried by one of the wheels 14, fixedly mounted on the front axle 12. A like connection is provided between the shaft 27 and one of the wheels 14', carried by the rear axle 12', the parts of such connection being indicated by the same numerals as like parts on the opposite side of the vehicle, but without the exponent prime, (').

The operation of our device will be as follows: Assuming that only the front engine is running and it is desired to drive the car in a forward direction, the movable friction clutch member 18 is thrown into engagement with its relatively fixed member 17 to connect the engine-shaft 16 with the driving-shaft 19, so that rotative motion is imparted to the shaft 19 and its disks 21 21' in the direction indicated by the arrow in Fig. 1. Now the actuating rack-rod 36 is moved to simultaneously shift the bearing-slides 24 and 24' in opposite directions out of their coaxial position in such directions that the driven-wheel 30' engages the driving-disk 21'. Accordingly the wheels 30 and 30' are both rotated in a forward direction, as indicated by the dotted arrow in Fig. 1, transmitting motion through their chain-and-sprocket connections to the wheels 14 and 14' upon the front and rear axles, respectively. It will thus be seen that without the aid of any direction-changing mechanism both the front and rear axles are positively driven in the same direction. To vary the speed of the rotation of the driven shafts 27 27', the wheels 30 and 30' are shifted radially across the faces of the driving-disks 21 21' by means of the transverse rack-bars 37 37', operated from the actuating rack-rods 42 42' by the gear mechanism 39 40 41, heretofore described. This shifting mechanism is so well known in the art that it is deemed unnecessary to further describe its action. Should it be desired that the car proceed in the opposite direction, the engine 15 may be stopped and the corresponding clutch thrown out of mesh, the engine 15' started, and the corresponding clutch thrown into mesh. Preferably these two engines drive in the same direction, and under such circumstances to drive the car forward under its new conditions the mechanism for shifting the bearing-slides 24 24' should be actuated to bring the wheel 30' into engagement with the disk 21' and the wheel 30 into engagement with the disk 21, as indicated in Fig. 3. Obviously the car may be driven in either direction from either end by the mechanism described.

It will now be apparent that our invention provides a car having two independent primary sources of power adapted to independently actuate a driving-shaft, and a gear mechanism so arranged as to transmit power from said driving-shaft simultaneously to both axles to propel both traction-wheel-carrying axles in like direction. Further, it will be apparent that by the use of the mechanism herein described no end thrust is imposed upon the shaft 18, as the pressure in one direction of one driven wheel against its coacting driving-disk is compensated for by the pressure in the opposite direction of the opposing driven wheel against its coacting driving-disk.

The loose slidable arrangement of the rectangular sleeve 32 upon the driving-shaft 19 provides a means for insuring the even distribution of the pressure upon the two wheels and disks.

Having thus described our invention, what we claim, and desire to secure by Letters Patent of the United States, is—

1. In a self-propelled vehicle, the combination of a frame, two independent axles mounted for rotation in said frame, traction-wheels carried by said axles, two primary sources of power mounted in longitudinal alinement at opposite ends of said frame, a driving-shaft independent of both engine-shafts mounted between said engines in alinement therewith, clutch devices for independently connecting either engine-shaft with the driving-shaft, two driving-disks mounted on said driving-shaft intermediate its ends, two driven shafts arranged transversely to said driving-shaft, bearing-slides supported from said shafts and carrying the inner ends of said driven shaft, mounted to move longitudinally relative to the driving-shafts, means for simultaneously moving said bearing-slides in opposite directions, driven wheels slidably mounted on said driven shafts, means for sliding said driven wheels upon their respective shafts, and a driving connection between one of said driven shafts and one of the axles and a connection between the opposite shaft and the opposite axle.

2. In a self-propelled vehicle, a frame, traction-wheels arranged at opposite ends of said frame, an engine arranged at each end of the frame, a driving-shaft arranged between the engines and normally disconnected therefrom, clutch devices at opposite ends of said driving-shaft for independently connecting the opposite ends of said shaft to the proximate engine-shafts, two independent driven shafts arranged transversely of the driving-shaft, frictional power-transmitting devices arranged to drive said driven shaft in like direction, a gearing connection between one of the driven shafts and a traction-wheel at one end of said vehicle, and driving connections between the opposite driven shafts and a traction-wheel at the other end of said vehicle.

3. In a power-transmitting device, a driving-shaft, two driving-disks arranged thereon in confronting relation, two driven shafts arranged on opposite sides of the driving-shaft, two driven wheels carried by said driven shafts, a sleeve loosely surrounding the driving-shaft, a bearing-slide for the inner end of each of said driven shafts slidably mounted upon said sleeve, and means for simultaneously moving the said bearing-slides in opposite direction, to bring the opposing driving-wheels into engagement with the opposing driving-disks.

In testimony that we claim the foregoing as our own we affix our signatures in presence of two witnesses.

WILLIAM O. WORTH.
JOHN D. WORTH.

In presence of—
MARY F. ALLEN,
GEORGE T. MAY, Jr.